United States Patent
Gardynik et al.

(10) Patent No.: US 12,280,832 B2
(45) Date of Patent: Apr. 22, 2025

(54) BUMPER SYSTEM AND BUMPER OPERATION METHOD FOR VEHICLE CLOSURE MODULE

(71) Applicant: Ford Global Technologies, LLC, Dearborn, MI (US)

(72) Inventors: Michael J. Gardynik, Farmington Hills, MI (US); David Brian Glickman, Southfield, MI (US); Mark Joseph Courtright, Allen Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 304 days.

(21) Appl. No.: 17/969,058

(22) Filed: Oct. 19, 2022

(65) Prior Publication Data
US 2024/0132159 A1   Apr. 25, 2024
US 2024/0227944 A9   Jul. 11, 2024

(51) Int. Cl.
*B62D 25/12* (2006.01)
*B60R 5/02* (2006.01)
*E05F 5/02* (2006.01)

(52) U.S. Cl.
CPC .............. *B62D 25/12* (2013.01); *B60R 5/02* (2013.01); *E05F 5/022* (2013.01); *E05Y 2900/536* (2013.01)

(58) Field of Classification Search
CPC .. E05F 5/022; E05F 5/025; E05F 5/06; B62D 25/12; B60R 2021/343; B60R 21/34
See application file for complete search history.

(56) References Cited

U.S. PATENT DOCUMENTS

| | | | |
|---|---|---|---|
| 7,690,722 B2 * | 4/2010 | Boggess | B60R 21/34 296/187.04 |
| 8,616,622 B2 | 12/2013 | Davis et al. | |
| 8,720,975 B1 * | 5/2014 | Perez | B60Q 1/0495 296/187.04 |
| 9,656,627 B2 | 5/2017 | Gardynik et al. | |
| 2023/0294774 A1 * | 9/2023 | Kowaczyk | E05D 5/0207 16/374 |

FOREIGN PATENT DOCUMENTS

| | | | |
|---|---|---|---|
| AU | 201354770 B2 | | 12/2011 |
| CN | 205854072 U | * | 1/2017 |
| CN | 213008395 U | * | 4/2021 |

* cited by examiner

*Primary Examiner* — Daniel J Colilla
(74) *Attorney, Agent, or Firm* — Vichit Chea; Carlson, Gaskey & Olds, P.C.

(57) ABSTRACT

A vehicle closure module overtravel accommodating system includes a closure module of a vehicle. The closure module is pivotably coupled to a vehicle frame and is configured to pivot relative to the vehicle frame back-and-forth between a closed position and an open position. The system further includes a breakaway mount of the vehicle, and a bumper assembly having a head disposed on a base. The bumper assembly engages the breakaway mount to secure the bumper assembly within the vehicle.

17 Claims, 4 Drawing Sheets

BUMPER SYSTEM AND BUMPER OPERATION METHOD FOR VEHICLE CLOSURE MODULE

TECHNICAL FIELD

This disclosure relates generally to a system that accommodates overtravel of a vehicle closure module and, more particularly, to a bumper secured to a breakaway mount.

BACKGROUND

Vehicles include various closure members (e.g., side doors, liftgates, hoods, trunk lids, etc.). The closure members are pivotably coupled to a vehicle body, and are configured to pivot back-and-forth between a closed position and an open position relative to the vehicle body. Bumpers can be used as a support surface for the closure member when the closure member is in a closed position.

SUMMARY

In some aspects, the techniques described herein relate to an vehicle closure module overtravel accommodating system, including: a closure module of a vehicle, the closure module pivotably coupled to a vehicle frame and configured to pivot relative to the vehicle frame back-and-forth between a closed position and an open position; a breakaway mount of the vehicle; and a bumper assembly having a head disposed on a base, the bumper assembly engaging the breakaway mount to secure the bumper assembly within the vehicle.

In some aspects, the techniques described herein relate to a system, wherein the breakaway mount is within a polymer-based trim component.

In some aspects, the techniques described herein relate to a system, wherein the breakaway mount includes a platform providing an aperture, a halo, and a plurality of spokes supporting the halo within the aperture of the platform, the base of the bumper assembly coupled to the halo to secure the bumper assembly within the vehicle.

In some aspects, the techniques described herein relate to a system, wherein the base of the bumper is a snap-fit base that is configured to snap-fit to the halo to secure the bumper assembly within the vehicle.

In some aspects, the techniques described herein relate to a system, wherein the bumper assembly includes a threaded rod connecting the bumper to the head.

In some aspects, the techniques described herein relate to a system, wherein the plurality of spokes of the breakaway mount are configured to sever in response to a load applied to the head that exceeds a threshold load, the halo and the bumper assembly detached from the platform when the plurality of spokes are severed.

In some aspects, the techniques described herein relate to a system, further including a replacement plate assembly that is configured to attach to the platform after the halo is detached from the platform, the replacement plate assembly providing an attachment location for the bumper assembly or another bumper assembly when the replacement plate assembly is attached to the platform.

In some aspects, the techniques described herein relate to a system, wherein the replacement plate assembly includes a plurality of clips that attach the replacement plate assembly to the platform.

In some aspects, the techniques described herein relate to a system, wherein the closure module is a vehicle hood.

In some aspects, the techniques described herein relate to a system, wherein the breakaway mount is part of a bolster that is disposed at an interface between the vehicle frame and the vehicle hood when the vehicle hood is in a closed position.

In some aspects, the techniques described herein relate to a system, wherein the halo has a rectangular profile.

In some aspects, the techniques described herein relate to a system, wherein the platform, halo, and the plurality of spokes are different portions of a singular trim component.

In some aspects, the techniques described herein relate to a system, wherein the head is an elastomeric head.

In some aspects, the techniques described herein relate to a vehicle closure module overtravel accommodating method, including: coupling a bumper assembly to a breakaway mount to secure the bumper assembly within a vehicle; moving a closure module of a vehicle from a closed position to an overtravel position; severing the breakaway mount of the vehicle to manage a load associated with the moving.

In some aspects, the techniques described herein relate to a method, wherein the breakaway mount includes a platform providing an aperture, a halo, and a plurality of spokes supporting the halo within the aperture of the platform, wherein severing the breakaway mount includes severing the plurality of spokes such that the halo is detached from the platform.

In some aspects, the techniques described herein relate to a method, further including, after the severing, attaching a replacement plate assembly to the platform and attaching a replacement bumper assembly to the replacement plate assembly.

In some aspects, the techniques described herein relate to a method, wherein the bumper assembly is reused as the replacement bumper assembly.

In some aspects, the techniques described herein relate to a method, further including attaching the replacement plate assembly to the platform using a plurality of clips.

In some aspects, the techniques described herein relate to a method, wherein a base of the bumper is snap-fit to the halo during the severing.

In some aspects, the techniques described herein relate to a method, wherein the closure module is a vehicle hood.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details an closure module overtravel accommodating system. The system includes bumper assemblies. When the closure member is closed against the bumpers, the bumper assemblies absorbs vibrations and noise. The bumper assemblies are secured within the vehicle using breakaway mounts. If a particular load is applied to the closure member when the closure member is closed, the breakaway can yield to permit overtravel of the closure member. The yielding can help to manage forces associate with the load.

Figure 1:
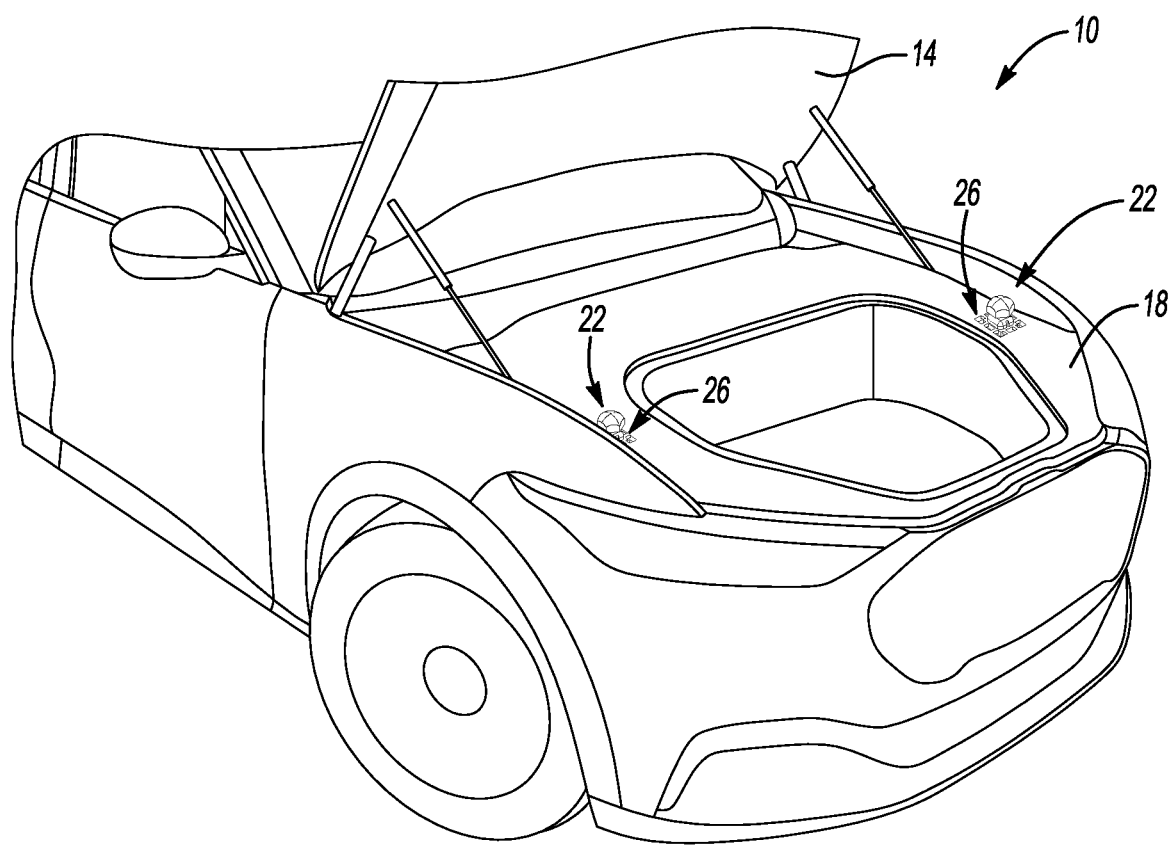
FIG. 1 illustrates a perspective view of a vehicle having bumper assemblies engaging respective breakaway mounts.

With reference to FIG. 1, a vehicle 10 includes a hood 14, a frame 18, and a pair of bumper assemblies 22 each mounted to a breakaway mount 26. The hood 14 is a type of closure module that is pivotably coupled to the frame 18. The hood 14 can pivot back-and-forth between a closed position and an open position relative to the frame 18. In FIG. 1, the hood 14 is shown in an open position. Other types of vehicle closure modules include side doors, liftgates, and trunk lids.

From time to time, a load could be applied to the hood 14 when the hood 14 is in the closed position. The load may be an impact load associated with the hood 14 striking something as the vehicle 10 is moving. If the impact load to the hood 14 exceeds a threshold amount, the breakaway mounts 26 yield permitting the bumper assemblies 22 to drop. The hood 14 can then overtravel as the impact load is applied. In this example, overtravel is movement of the hood 14 from the closed position toward the frame 18. Permitting overtravel can help to manage energy associated with the impact load by distributing energy and forces associated with the impact load over a longer time period.

Figure 2:
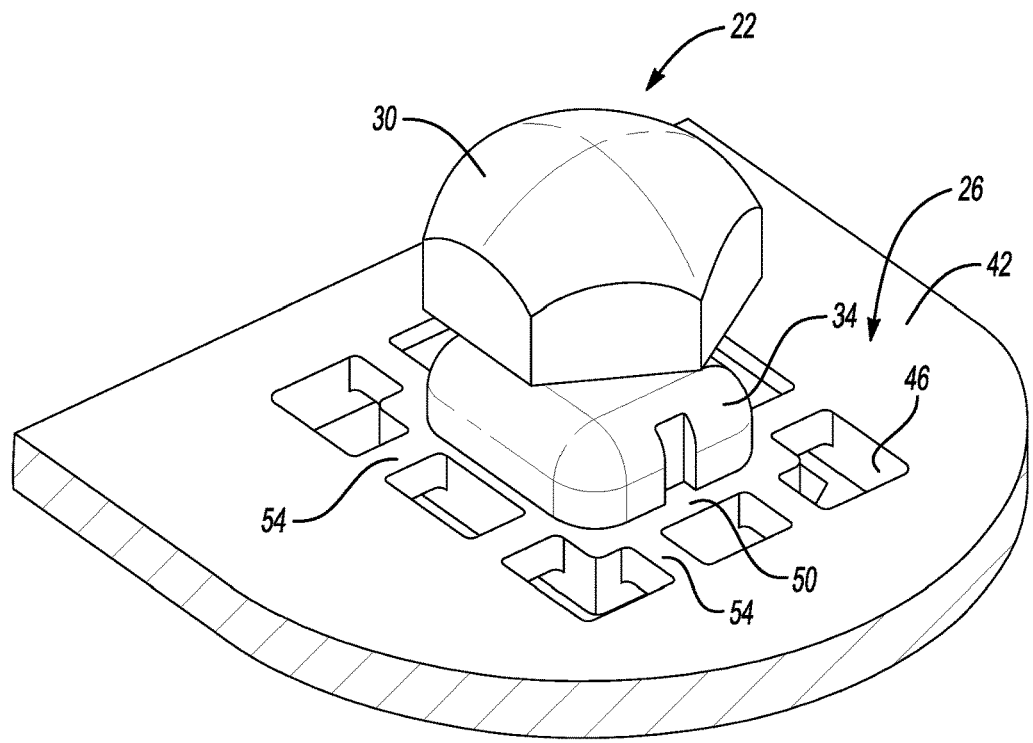
FIG. 2 illustrates a close-up, perspective view of a bumper assembly and breakaway mount from the vehicle of FIG. 1.
Figure 3:
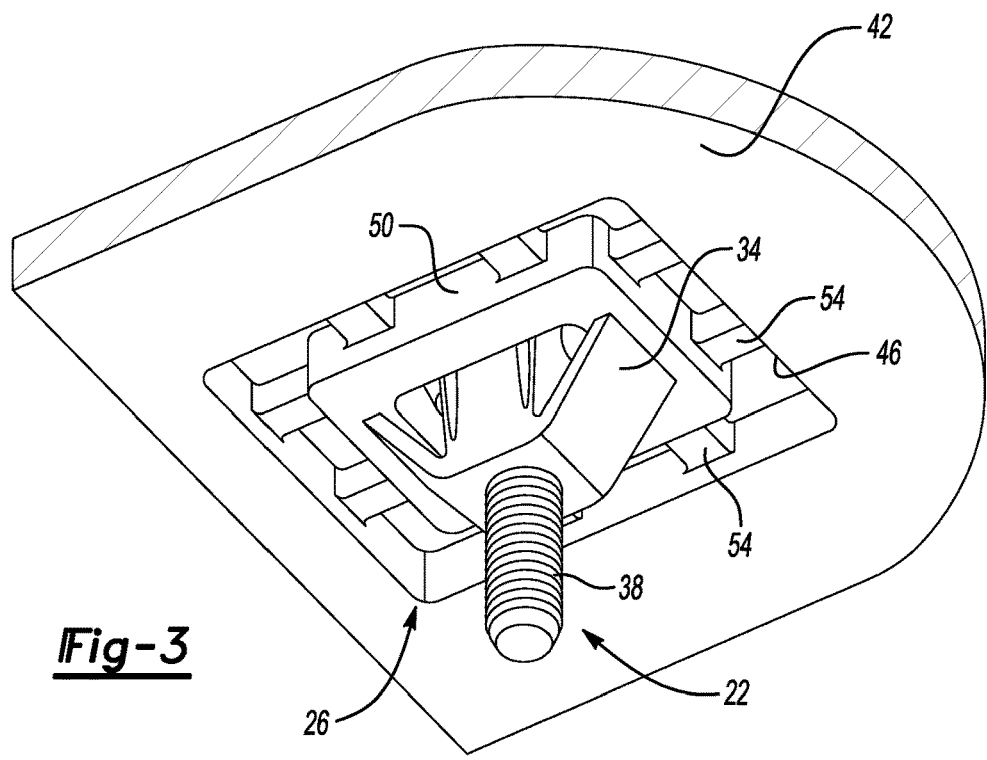
FIG. 3 illustrates an underneath view of the bumper assembly and breakaway mount of FIG. 2.

The bumper assembly 22 on the driver side of the vehicle 10 is shown in FIGS. 2 and 3. The bumper assembly 22 on the passenger side is configured the same as the bumper assembly 22 on the driver side.

As shown in FIGS. 2 and 3, the bumper assembly 22 on the driver side includes a head 30 secured to base 34 with a threaded rod 38. The head 30 provides a stop for the hood 14 when the hood 14 is closed. The head 30 is an elastomeric head in this example. The hood 14 directly contacts the head 30 when in the closed position. The head 30 can be raised or lower via the threaded rod 38 to fine tune a closed position of the hood 14.

The breakaway mount 26 on the driver side includes a platform 42 providing an aperture 46, a halo 50, and a plurality of spokes 54 supporting the halo 50 within the aperture 46. The example halo 50 has a rectangular profile. The platform 42, halo 50, and the spokes 54 are molded together and are different portions of a singular trim component.

The base 34 snap-fits or clips to the halo 50 to engage together the bumper assembly 22 and the halo 50. This engagement secures the bumper assembly 22 within the vehicle 10.

The breakaway mount 26 is within a polymer-based trim component—here a bolster—that is disposed at an interface between the frame 18 and the hood 14 when the hood 14 is in a closed position. The breakaway mount 26 can be within another type of component in another examples. For example, the breakaway mount 26 could be provided in a metal (e.g., magnesium), metal alloy, or carbon-fiber based component.

Figure 4:
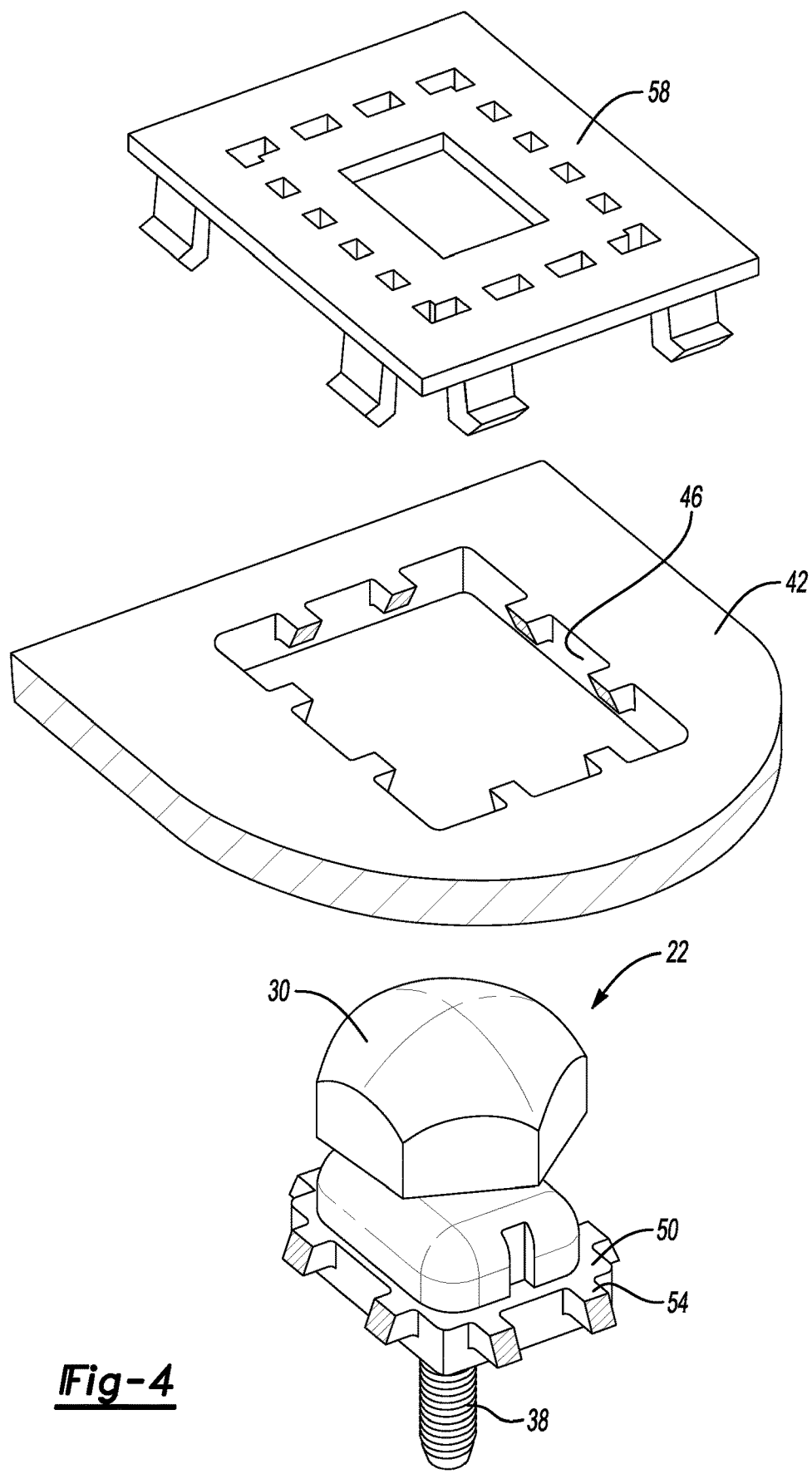
FIG. 4 illustrates a replacement plate assembly and a platform of the breakaway mount of FIGS. 2 and 3 after a plurality of spokes of the breakaway mount have been severed to separate a halo of the breakaway mount from the platform.

As shown in FIG. 4, the spokes 54 of the breakaway mount 26 sever in response to a load applied to the head 30 that exceeds a threshold load. The load exceeding the threshold load can result from an impact load contacting the hood 14 when the hood 14 is closed.

When the spokes 54 are severed as shown in FIG. 4, the bumper assembly 22 and the halo 50 are detached from the platform 42. This allows the bumper assembly 22 to move so that the hood 14 can overtravel and manage the distribution of forces and energy associated with the impact load.

Figure 5:
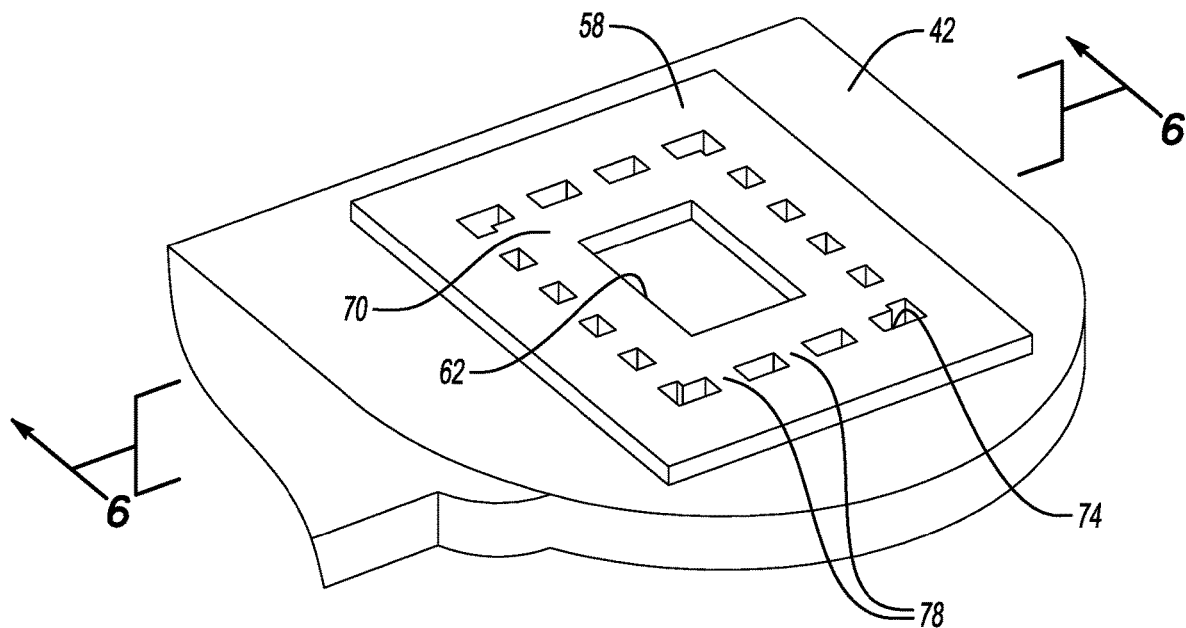
FIG. 5 illustrates the replacement plate assembly and platform of FIG. 4 after the replacement plate assembly is attached to the platform.
Figure 6:
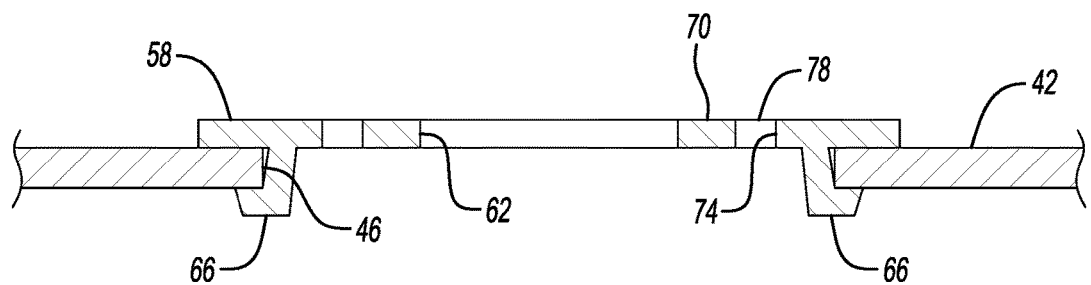
FIG. 6 illustrates a section view at line 6-6 in FIG. 5.

After accommodating overtravel is no longer needed, a replacement plate assembly 58 can be attached to the platform 42 as shown in FIGS. 5 and 6. The bumper assembly 22 can be separated from the halo 50 and snap-fit within an aperture 62 of the replacement plate assembly 58 so that the bumper assembly 22 can be reused. Alternatively, a replacement bumper assembly can be secured to the replacement plate assembly 58.

The replacement plate assembly 58 includes a plurality of clips 66 that attach the replacement plate assembly 58 to the platform 42. Other attachment devices could be used to attach the replacement plate assembly 58 to the platform 42 in other examples.

The replacement plate assembly 58 includes a replacement halo 70 supported within a replacement plate aperture 74 by a plurality of replacement spokes 78. The replacement spokes 78 can sever in response to overtravel of the hood 14. The replacement plate assembly 58 can then be replaced by another replacement plate assembly, if required.

Features of the disclosed embodiments include a breakaway mount used in connection with a bumper assembly. The breakaway mount is separate from the bumper assembly. The bumper assembly can thus be designed without features to accommodate overtravel, which can increase complexity of the bumper assembly. A replacement plate assembly can be used to adapt the breakaway mount for reuse and to accommodate another bumper assembly.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A vehicle closure module overtravel accommodating system, comprising:
    a closure module of a vehicle, the closure module pivotably coupled to a vehicle frame and configured to pivot relative to the vehicle frame back-and-forth between a closed position and an open position;
    a breakaway mount of the vehicle; and
    a bumper assembly having a head disposed on a base, the bumper assembly engaging the breakaway mount to secure the bumper assembly within the vehicle,
    wherein the breakaway mount comprises a platform providing an aperture, a halo, and a plurality of spokes supporting the halo within the aperture of the platform, the base of the bumper assembly coupled to the halo to secure the bumper assembly within the vehicle,
    wherein the plurality of spokes of the breakaway mount are configured to sever in response to a load applied to the head that exceeds a threshold load, the halo and the bumper assembly detached from the platform when the plurality of spokes are severed, wherein the platform is configured to attach to a replacement plate assembly after the halo is detached from the platform, the replacement plate assembly providing an attachment location for the bumper assembly or another bumper assembly when the replacement plate assembly is attached to the platform.

2. The system of claim 1, further comprising a polymer-based trim component, wherein the breakaway mount is within the polymer-based trim component.

3. The system of claim 1, wherein the breakaway mount comprises a platform providing an aperture, a halo, and a plurality of spokes supporting the halo within the aperture of the platform, the base of the bumper assembly coupled to the halo to secure the bumper assembly within the vehicle.

4. The system of claim 3, wherein the base of the bumper assembly is a snap-fit base that is configured to snap-fit to the halo to secure the bumper assembly within the vehicle.

5. The system of claim 4, wherein the bumper assembly includes a threaded rod connecting the bumper assembly to the head.

6. The system of claim 3, wherein the plurality of spokes of the breakaway mount are configured to sever in response to a load applied to the head that exceeds a threshold load, the halo and the bumper assembly detach from the platform when the plurality of spokes are severed.

7. The system of claim 3, wherein the closure module is a vehicle hood.

8. The system of claim 7, wherein the breakaway mount is part of a bolster that is disposed at an interface between the vehicle frame and the vehicle hood when the vehicle hood is in a closed position.

9. The system of claim 3, wherein the halo has a rectangular profile.

10. The system of claim 3, wherein the platform, halo, and the plurality of spokes are different portions of a singular trim component.

11. The system of claim 1, wherein the head is an elastomeric head.

12. A vehicle closure module overtravel accommodating system, comprising:

a closure module of a vehicle, the closure module pivotably coupled to a vehicle frame and configured to pivot relative to the vehicle frame back-and-forth between a closed position and an open position;

a breakaway mount of the vehicle;

a bumper assembly having a head disposed on a base, the bumper assembly engaging the breakaway mount to secure the bumper assembly within the vehicle, wherein the breakaway mount comprises a platform providing an aperture, a halo, and a plurality of spokes supporting the halo within the aperture of the platform, the base of the bumper assembly coupled to the halo to secure the bumper assembly within the vehicle, wherein the plurality of spokes of the breakaway mount are configured to sever in response to a load applied to the head that exceeds a threshold load, the halo and the bumper assembly detached from the platform when the plurality of spokes are severed; and a replacement plate assembly that is configured to attach to the platform after the halo is detached from the platform, the replacement plate assembly providing an attachment location for the bumper assembly or another bumper assembly when the replacement plate assembly is attached to the platform.

13. The system of claim 12, wherein the replacement plate assembly includes a plurality of clips that attach the replacement plate assembly to the platform.

14. A vehicle closure module breakaway mount replacement method, comprising:

providing a breakaway mount that includes a platform having an aperture, a halo holding a bumper assembly, and a plurality of spokes, the plurality of spokes severed such that the halo and the bumper assembly are detached from the platform, the plurality of spokes severed to manage a load associated with moving a closure module of a vehicle from a closed position to an overtravel position;

removing the halo and the bumper assembly from the platform; and attaching a replacement plate assembly to the platform, the replacement plate assembly including a replacement bumper assembly.

15. The method of claim 14, wherein the closure module is a vehicle hood.

16. The method of claim 14, wherein a base of the bumper assembly is snap-fit to the halo.

17. The method of claim 14, further comprising attaching the replacement plate assembly to the platform using a plurality of clips.

* * * * *